United States Patent [19]

Vicik

[11] Patent Number: 4,857,399

[45] Date of Patent: * Aug. 15, 1989

[54] SHRINK FILM

[75] Inventor: Stephen J. Vicik, Darien, Ill.

[73] Assignee: Viskase Corporation, Chicago, Ill.

[ * ] Notice: The portion of the term of this patent subsequent to Aug. 15, 2006 has been disclaimed.

[21] Appl. No.: 172,832

[22] Filed: Mar. 25, 1988

Related U.S. Application Data

[63] Continuation-in-part of Ser. No. 946,722, Dec. 29, 1986, now U.S. Pat. No. 4,734,327.

[30] Foreign Application Priority Data

Dec. 18, 1987 [CA] Canada .................................. 554878
Dec. 21, 1987 [EP] European Pat. Off. ........ 87-118920.5

[51] Int. Cl.$^4$ ........................ B32B 27/08; B32B 27/16
[52] U.S. Cl. ................................ 428/332; 428/474.4; 428/474.7; 428/515; 428/516

[58] Field of Search ...................... 428/35, 474.5, 515, 428/474.7, 516, 332

[56] References Cited

U.S. PATENT DOCUMENTS

| | | | |
|---|---|---|---|
| 4,207,363 | 6/1980 | Lustig et al. | 428/35 |
| 4,469,742 | 9/1984 | Oberle et al. | 428/35 |
| 4,501,780 | 2/1985 | Walters et al. | 428/35 |
| 4,724,185 | 2/1988 | Shah | 428/35 |
| 4,734,327 | 3/1988 | Vicik | 428/515 |

*Primary Examiner*—Paul J. Thibodeau
*Attorney, Agent, or Firm*—John C. Lefever

[57] ABSTRACT

A four layer shrink film comprising an ethylene-propylene random copolymer as a meat contact first layer, a blend of anhydride-modified ethylene copolymer adhesive and EVA as an inner core second layer, a blend of EVOH and amide polymer as a barrier third layer, and a blend of anhydride- modified ethylene copolymer adhesive and EVA as an abuse fourth layer.

30 Claims, No Drawings

SHRINK FILM

RELATED APPLICATION

This application is a continuation-in-part of Ser. No. 946,722 filed Dec. 29, 1986 in the name of Stephen J. Vicik and entitled "Cook-In Shrink Film" issued Mar. 29, 1988 as U.S. Pat. No. 4,734,327.

BACKGROUND OF THE INVENTION

This invention relates generally to heat shrinkable, relatively gas impermeable thermoplastic multilayer films which can be used in the form of a hermetically sealed bag for packaging meat products, as for example fresh red meat or cook-in systems wherein the packaged meat is submerged in heated water for cooking. Under these conditions the bag film is shrinkable against the meat and retains its integrity.

As used herein, "cook-in" refers to packaging material structurally capable of withstanding exposure to long and slow cooking conditions while containing a food product, for example submersion in water at 68°–85° C. (115°–185° F.) for 4–6 hours. Cook-in packaged foods are essentially pre-packaged, pre-cooked foods which may be directly transferred to the consumer in this form. These types of foods may be consumed with or without warming. Cook-in packaging materials maintain seal integrity and in the case of multilayer films, are delamination resistant. Cook-in films must also be heat shrinkable under cook-in conditions so as to form a tightly fitting package.

Some films are suitable for holding meats such as ham which is cooked at temperatures up to about 82° C. (180° F.), but are not always suitable for holding meats such as beef which are sometimes cooked at higher temperatures up to about 92° C. (200° F.), hereinafter referred to as the "high temperature cooking range". For example, Surlyn 1650 (manufactured by the DuPont Company) may be used as the food-contacting layer of a multilayer cook-in film for ham, but would not be satisfactory for the high temperature cook-in range because its melting point is 94° C. (205° F.). Accordingly, cook-in films suitable for the high temperature cook-in range require a food-contacting layer having a melting point of at least 100° C. (212° F.).

Cook-in films for beef in the high temperature cooking range should have an inner surface which does not adhere to the meat. Beef is relatively dry and has a fiber structure which would be retained by an adhering film surface causing the disrupted surface of the cooked product to be asthetically unpleasing to the consumer. This is to be contrasted from ham cook-in wherein the film inner surface should adhere to the ham outer surface to retain the juices within the relatively moist, ham product.

Another requirement for certain multilayer clear films is that they have good optical clarity, i.e. gloss of at least about 55% and haze below about 15%.

There are numerous other requirements for a high temperature shrink film, including: delamination resistance, low oxygen permeability, and heat shrinkability representing about 20–45% biaxial shrinkage at about 90° C. (194° F.).

In U.S. Pat. No. 4,606,922 the prior art has described an irradiated multilayer food casing having an outer nylon layer over one or more interior layers and having a Surlyn food contact inner surface, for example, the structure nylon (outer)/adhesive/Surlyn (inner). Nylon is described as providing an oxygen barrier to impede the inward diversion of oxygen and to impart relatively high stuffing strength to the casing. However, this film is not shrinkable and must be stuffed with a flowable meat product to insure sufficient film contact. Also, the nylon outer layer loses its effectiveness as an oxygen barrier because of moisture uptake from the atmosphere. Finally, Surlyn adheres to meat so would be unsuitable as the inner surface of a beef cook-in film.

U.S. Pat. No. 4,606,922 also describes a four layer shrinkable film comprising EVA/saran/EVA/ionomer. However, the necessary irradiation has a degrading effect on the vinyl chloride-vinylidene copolymer (saran).

Another commercially employed cook-in film is the type described in Oberle et al U.S. Pat. No. 4,469,742, comprising six layers irradiated to dosage of preferably at least 6 MR. The central barrier layer is hydrolyzed ethylene-vinyl acetate copolymer (EVOH), chosen because of its higher softening point and superior oxygen barrier properties as compared to the saran-type barrier layer commonly used in multilayer films for ambient temperature applications. On each side of the barrier layer is an adhesive layer such as chemically modified polyethylene, eg. Plexar. On the outer side of each adhesive layer is a shrink layer such as ethylene-vinyl acetate copolymer (EVA), and the outside (abuse) layer is also the EVA type having a vinyl acetate content of about 5–12 wt. %. The innermost (heat sealing) layer may for example be an ethylene-propylene random copolymer. Processing of a six layer film requires a complex die and careful resin selection within a limited number of possibilities.

It will be apparent from the foregoing that these prior art cook-in films are complex both in terms of multiple materials and sophisticated manufacturing techniques, and some are not heat shrinkable.

A possible solution to the foregoing problems is a four layer film with EVOH as the barrier layer, but tests have shown that such prior art films with even only three layers, i.e., no inner layer designed for high temperature cook-in contact with beef, either would not biorient, would tend to delaminate during cooking or have poor optical properties or have unacceptably low shrink value for cook-in applications, or a combination of these problems. Certain of these problems may be overcome by the use of EVOH-polyamide blend core layers, but multilayer films of this type with EVA inner and outer layers have typically been found to delaminate under cook-in conditions and in any event would not withstand high temperature beef cook-in.

A possible approach to this delamination problem is the use of adhesives, but adhesives suitable for EVOH would not be expected to biorient or in heavier gauges might be expected to be hazy or they might not provide the required shrinkage.

One object of this invention is to provide an improved high temperature cooking range multilayer plastic film suitable for fresh red meat and cook-in systems which has less than six layers including a nonadhering inner surface for meat contact.

Another object of this invention is to provide a less-than-six layer high temperature cooking range plastic film which has good optical clarity and a nonadhering meat contact surface.

Still another object of this invention is to provide a less-than-six layer high temperature cooking range type film having high shrink, good optical clarity, a nonadhering meat contact surface and no blocking problem.

A further object of this invention is to provide such a less-than-six layer high temperature cooking range type film which does not require additives such as processing aids and does not require high irradiation dosage level on the order of 6 MR to realize high strength.

Other objects and advantages will be apparent from the ensuring disclosure and appended claims.

SUMMARY OF THE INVENTION

It has been unexpectedly discovered that all of the aforementioned objects may be achieved by a four layer film comprising: (a) a first or meat contact layer comprising an ethylene-propylene random copolymer, (b) a second or inner core layer directly adhered to one side of the first layer comprising a blend of between about 20 and 60 wt. % anhydride-modified ethylene copolymer adhesive having a Vicat softening point of at least about 90° C. (194° F.), and between about 40 and 60 wt. % ethylene vinyl acetate containing between about 4 and 15 wt. % vinyl acetate, the blend having a melt index up to and including about 0.9.

A third or barrier layer is directly adhered to the opposite side of the second layer form the first layer, and comprises a blend of between about 60 and 90 wt. % hydrolyzed ethylene vinyl acetate copolymer (EVOH) containing between about 32 and 52 wt. % ethylene, and between about 10 and 40 wt. % amide polymer having a melting point within 25° C. of the EVOH melting point.

A fourth or abuse layer is directly adhered to the opposite side of the third layer from the second layer. This fourth layer comprises a blend of between about 10 to 40 wt. % anhydride-modified ethylene copolymer adhesive having a Vicat softening point of at least about 90° C. (194° F.), and between about 60 and 90 wt. % ethylene vinyl acetate containing between about 4 and 15 wt. % vinyl acetate, the blend having a melt index up to and including about 0.9.

For cook-in systems the entire film is preferably irradiated, most preferably at a level of between about 2 and 4 MR.

It has also been unexpectedly discovered that if higher impact strength is needed, the same may be realized without adversely affecting the aforedescribed film's good optical properties by including up to about 20 wt. % very low density polyethylene in the first (meat contact) layer.

DEFINITIONS

As used herein, the terms set forth below will be understood to have the following meanings:

"Polymer" includes homopolymers, copolymers, terpolymers and block, graft or random polymers.

"Amide" or "amide polymer" means a Nylon including polycaproamide, poly(hexamethylene adipamide), poly (hexamethylene sebacamide), poly (hexamethylenediamine dodecanedioic acid), polycapryllactam, poly (w-aminoundecanoic acid), and poly (w-dodecanolactam). These Nylons are respectively normally known as Nylon 6; nylon 6,6; Nylon 6,10; Nylon 6,12; Nylon 8; Nylon 11; and Nylon 12. Another suitable amide polymer is Nylon 6,66 (Chemical Abstracts Service No. 24993-04-2). Still another suitable amide polymer is Nylon 6/12 manufactured by the copolymerization of epsilon-caprolactam and omega-laurolactam.

"Hydrolyzed ethylene-vinyl acetate" or "EVOH" means a hydrolyzed ethylene-vinyl acetate copolymer, preferably hydrolyzed to at least about 50%, most preferably to greater than about 99%. These compositions are also referred to as ethylene-vinyl alcohols and are ordinarily prepared by saponification, so are sometimes called "saponified ethylene-vinyl acetate copolymers".

"Ethylene-propylene random copolymer" means copolymers of ethylene and propylene having ethylene units randomly distributed along with copolymer backbone as distinguished from ethylene units polymerized in a block or "cluster" manner, ie. PPPPP-E-PP-E as distinguished from PPEE-EEPP-PPEE.

"Linear low density polyethylene" or "LLDPE" means copolymers of ethylene and certain other heavier olefins as for example butene, hexene and octene, having a density of at least about 0.91 gm/cm$^3$ and below about 0.94 gm/cm$^3$.

"Very low density polyethylene" or "VLDPE" or "ULDPE" means copolymers of ethylene and higher alpha olefins containing from 3 to 8 carbon atoms, having a density below about 0.91 g/cm$^3$ and a 1% secant modulus below about 140,000 kPa.

"Anhydride" means a compound (usually an acid) from which water has been removed. An example if maleic anhydride.

"Anhydride-modified ethylene copolymer adhesive" means comprises an ethylene copolymer, as for example, LLDPE with anhydride grafted thereto, or a terpolymer comprising ethylene, a comonomer and an anhydride.

"Irradiation" means exposure to high energy radiation such as electrons, X-rays, gamma rays, beta rays and the like, which induce cross-linking between the molecules of the irradiated material. Preferably, irradiation is carried out by an electron accelerator and the dosage level is determined by standard dosimetry methods. The dosage is measured in "rads" wherein one rad is the absorbed dose of ionizing radiation equal to an energy of 100 ergs per gram of irradiation material. A megarad (MR) is one million rads.

DETAILED DESCRIPTION

The first (meat contact) layer is in direct contact with the meat and must withstand the previous described high temperature cook-in conditions as for example required for beef. The first layer is an ethylene-propylene random copolymer preferably containing between about 1 and 5 wt. % ethylene. As the randomness of the ethylene-propylene copolymer increases, crystallinity decreases thereby broadening the melt range of the random copolymer. Higher levels of ethylene above about 10 wt. % result in copolymers of the more crystalline block type which are difficult to shrink. This type of compound has a melting point of at least about 135° F., so is suitable for beef cook-in.

Suitable random ethylene-propylene copolymers include Fortilene 40×05 and Fortilene 42×07, both sold by Soltex Polymer Corporation, Houston, Tex.

The first layer is preferably up to about 1.2 mils thick to perform its intended function. Thicker layers to not significantly improve performance, and may reduce flexibility of the overall film. The first layer thickness is preferably at least 0.5 mils for heat sealability, so that the preferred thickness range for this layer is between about 0.3 and 1.2 mils.

The second (inner core) layer of this multilayer film is directly adhered to one side of the first (meat contact) layer, and is also directly adhered to the third (barrier) layer. The second layer provides adhesion between the first (meat contact) layer and the third (barrier) layer, and also aids processability, for example, affording the needed biaxial stretchability. This layer comprises a blend including between about 40 and 80% ethylene vinyl acetate (EVA) containing between about 4 and 15 wt. % vinyl acetate, and between about 20 and 60 wt. % anhydride-modified ethylene copolymer adhesive. These proportions are based on a need for both shrink and adhesive properties. For packaging fresh red meat, high shrink is more important so the EVA content should be relatively high. For beef cook-in packaging, adhesion is of greater importance so the adhesive content should be relatively high.

The vinyl acetate content of the EVA blend component should be at least 4 wt. % of the EVA to provide the desired high shrink, but no higher than about 15 wt. % to allow the needed biaxial orientation. A preferred balance of these characteristics is a vinyl acetate content of between about 7 and 12 wt. % of the ethylene vinyl acetate.

The anhydride-modified ethylene copolymer adhesive comprises at least about 20 wt. % of the blend to provide the needed adhesion between the first and third layers under cook-in conditions and avoid blocking. The adhesive does not comprise more than about 60 wt. % of the blend to keep the melt index of this layer in the desired range for processing ease of the multilayer film. That is, the film must be readily processed for biaxial stretching to achieve the needed stretchability and high shrink in both TD and MD directions. Also, the adhesive component of the second layer blend should not be more than about 60 wt. % to retain the needed toughness (impact resistance) for the multilayer film. A preferred balance of these characteristics is an adhesive content of between about 30 and 45 wt. % (and 55–70% EVA) in the second layer. A blend comprising 50 wt. % EVA and 50 wt. % adhesive is not recommended.

The Vicat softening point of the adhesive component of the second layer blend should be at least about 90° C. (194° F.) to avoid softening of the first second layer and second-third layer interfaces during fresh red meat packaging or cooking.

The melt index of the second (inner core) layer is up to and including 0.9 so that the multilayer film may be readily biaxially oriented. Higher second layer melt indexes than about 0.9 result in weak films which cannot be stretched without tearing and or process interruptions such as bubble breaks.

The thickness of the second (inner core) layer is preferably between about 0.75 and 2.0 mils. Thinner layers may not perform the aforedescribed functions while thicker layers do not appreciably improve processability of the film and may reduce film stretchability.

Suitable anhydride-modified ethylene copolymer adhesives for use in the blend of the second (inner core) layer include the low density polyethylene types and especially the maleic anhydride-modified linear low density polyethylene such as the compound commercially known as Admer TM NF-500 manufactured by Mitsui Petrochemical Industries Ltd. of Tokyo, Japan. According to the manufacturer, Admer NF-500 has a Vicat softening point of 100° C. or 212° F. (ASTM D1525) and a melting point of 120° C. or 248° F. (ASTM D2117).

Other possibly suitable adhesives include modified linear low density polyethylenes, modified medium density polyethylenes and modified high density polyethylenes, as for example certain of the Plexar TM compounds manufactured by the Chemplex Company of Rolling Meadows, Il., as summarized in the following Table A.

TABLE A

Suitable PLEXAR Adhesives

| Grade (Base) | Melt Index (g/10 sm) | Vicat Softening Point °C. (°F.) |
|---|---|---|
| 169 (modified low density polyethylene) | 2.6 | 94 (201) |
| 201 (modified high density polyethylene) | 0.85 | 127 (260) |
| 281 (modified linear low density polyethylene) | 1.8 | 127* (260) |

*melting point

A possibly suitable anhydride-modified ethylene vinyl acetate adhesive is PLEXAR 108, having a 90° C. Vicat softening point and 9 wt. % vinyl acetate.

With respect to the third (barrier) layer, the amide polymer performs a plasticizing function for the hydrolyzed ethylene vinyl acetate copolymer (EVOH) which is the oxygen barrier component. The amide polymer must comprise at least 10 wt. % of the amide polymer-EVOH blend for processing, i.e., stretchability, into a biaxially oriented film. On the other hand, to retain the oxygen barrier performance the amide polymer should not comprise more than about 40 wt. % of the blend. As a preferred balance of these characteristics, the third (barrier) layer comprises between about 70 and 85 wt. % hydrolyzed ethylene-vinyl acetate copolymer blended with between about 15 and 30 wt. % amide polymer.

Preferred amide polymers for the third layer are Nylon 6 types, in particular Nylon 6/12 and Nylon 6/66.

The EVOH contains at least 32 wt. % ethylene for processing ease, i.e. to achieve the desired film shrinkage and stretching characteristics. This is because the EVOH melting point and is ethylene content are inversely related and a relatively higher melting point increases processing difficulties. The ethylene content of the EVOH is less than about 52 wt. % ethylene to achieve bubble integrity at the required stretch conditions, and also maintain an acceptable oxygen barrier. The latter property improves with decreasing ethylene content. As a preferred balance of these characteristics, the hydrolyzed ethylene-vinyl acetate copolymer contains between about 38 and 48 wt. % ethylene.

The melting point of the amide polymer is within about 25° C. of the EVOH melting point for compatability with the EVOH copolymer which typically melts between about 310° C. and 365° F. As will be demonstrated by comparative data, greater differences in these melting points result in poor film clarity, ie. optical properties. In a preferred embodiment the amide polymer is within 15° C. of the EVOH melting point.

The third (barrier) layer constituents are provided in proportions and quantities such than the oxygen transmission rate through the entire multilayer film is below about 90 cc/M$^2$/mil thickness/24 hrs./Atm. This is necessary to avoid spoilage of the food enclosed in the cook-in film due to oxygen passage from the environment through the film wall. The third (barrier) layer thickness is preferably up to about 0.3 mils to perform its intended function for the cook-in application. Thicker barrier layers do not appreciably improve performance. The barrier layer is most preferably between about 0.05 and 0.3 mils thick to perform its intended function and provide maximum flexibility.

The fourth (abuse) layer of this multilayer film is directly adhered to the opposite side of the third (barrier) layer from the second (inner core) layer. This layer is in direct contact with the environment including the heating fluid during cook-in. Since it is seen by the user/consumer, it must enhance optical properties of the multilayer film for all packaging applications including fresh red meat and cook-in. Also, it must withstand contact with sharp objects so is termed the abuse layer and provides abrasive resistance. The fourth layer comprises a blend including between about 60 and 90% ethylene vinyl acetate. As with the second (inner core) layer, the vinyl acetate should be at least about 4 wt. % of the EVA to provide the desired high shrink, but no higher than about 15 wt. % to allow the needed biaxial stretching for high shrink in both directions. A preferred balance between these characteristics is a vinyl acetate content of between about 7 and 12 wt. % of the ethylene vinyl acetate.

The other component in the fourth (abuse) layer blend is between about 10 to 40% non-orientable anhydride-modified ethylene copolymer adhesive. Suitable fourth layer adhesives include the types previously discussed in connection with the second layer. This adhesive may, but need not, be the same adhesive as that used in the second (inner core) layer. The adhesive must comprise at least about 10 wt. % of the blend to provide the needed adhesion, and should be less than about 40 wt. % of the blend so as not to build in too much resistance to biaxial stretching. Any suitable adhesive tends to limit biaxial stretching and a higher adhesive content (up to 60 wt. %) may be needed in the second (inner core) layer to adequately bond the first and third layer. Another reason for the 40 wt. % adhesive upper limit in the fourth (abuse) layer is that for clear films, the adhesive should not adversely affect the film's optical properties. That is the clear multilayer film gloss should be at least 55% and the haze should be below about 15%. A preferred balance of these fourth layer properties is a blend comprising between about 10 and 20% by weight adhesive and between about 80 and 90% by weight vinyl acetate.

The Vicat softening point of the adhesive component in the fourth layer should be at least about 194° F. and its melt index is up to and including about 0.9, each of the same reason previously discussed in connection with the second (inner core) layer.

The fourth (abuse) layer thickness is preferably between about 0.50 and 0.85 mils. Thinner layers may be less effective in providing the abuse resistance protection, while thicker layers may not improve performance in this respect and may reduce film stretchability.

The thickness of the aforedescribed four layer film is preferably between about 2.0 and 3.5 mils. Lower thicknesses reduce the effectiveness of at least one of the four layers to perform the aforedescribed functions, while higher thicknesses reduce the film flexibility and do not appreciably improve its performance.

The entire multilayer film of this invention is preferably irradiated, and at a level of between about 2 and 4 MR to increase its layer adhesion strength at cook-in conditions. Lower irradiation levels do not provide improved strength and higher levels tend to degrade the elongation properties of the film. Irradiation may be performed prior to biaxial orientation but is preferably done after this step on the stretched and thinner film.

A preferred embodiment of this four layer cook-in shrink film comprising a first (meat contact) layer of ethylene-propylene random copolymer containing between about 1 and 5 wt. % ethylene; a second (inner core) layer directly adhered to one side of the first layer comprising a blend of between about 30 and 50 wt. % maleic anhydride-modified linear low density polyethylene adhesive having a Vicat softening point of about 100° C. and a melting point of about 120° C., and between about 50 and 70 wt. % ethylene vinyl acetate containing between about 10 and 12 wt. % vinyl acetate, said blend having a melt index up to and including about 0.9. A third (barrier) layer is directly adhered to the opposite side of the second layer from the first layer and comprises a blend of between about 70 and 85 wt. % EVOH and between about 15 and 30 wt. % amide polymer. The latter's melting point is within about 15° C. of the EVOH melting point. A fourth (abuse) layer is directly adhered to the opposite side of the third layer from the second layer, and comprises a blend of between about 10 and 20 wt. % maleic anhydride-modified linear low density polyethylene and about 80 and 90 wt. % ethylene vinyl acetate having between about 10 and 12 wt. % vinyl acetate, said blend having a melt index up to and including about 0.9. The film has gloss of at least about 55% and haze below about 15%. The entire film is irradiated to between about 2 and 4 MR.

In general, various conventional additives such as slip agents and pigments can be incorporated in the film in accordance with conventional practice.

While this invention is specifically described in terms of four layers, it should be understood that one or more additional layers may be directly adhered to the outside of the fourth (abuse) layer.

The multilayer film of this invention is preferably manufactured in tubular form by simultaneous co-extrusion of the four layers using the conventional double bubble technique as, for example, described in U.S. Pat. No. 3,555,604. Alternatively, the four layer film may be manufactured by the coating lamination version of the double bubble technique as, for example, described in U.S. Pat. No. 3,741,253. In the double bubble technique, the primary tube is biaxially oriented by stretching with internal pressure in the transverse direction and with the use of pinch rolls at different speeds in the machine direction. Then the bubble is collapsed. After cooling, the biaxially oriented tube is flattened and guided through an ionizing radiation field.

The stretch radio in the biaxial orientation is preferably sufficient to provide a multilayer film with total thickness preferably between about 2.0 and 3.5 mils. A streteh ratio of about 12:1 to 20:1 may be used to impart a shrink capacity of about 20–45% free shrinkage at 90° C. (based on ASTM D2732).

The multilayer film is wound up as flattened, seamless, tubular film to be used later to make bags. This may be accomplished by end seals, typically made by transverse heat sealing across the width of flattened tubing followed by severing the tubing so that the transverse seal forms the bag bottom. Alternatively, side-seal bags may be formed in which the transverse seals form the bag sides and one edge of the tubing forms the bag bottom.

For cook-in packaging the bags are used by placing the food product in the bag, evacuating the bag and sealing the open portion as by clipping. The evacuated product-containing bag is then immersed in a hot liquid bath typically about 150° C. to 190° F., to uniformly shrink the film against the product outer surface. For fresh red meat packaging the evacuated product-containing bag is placed in a hot water tunnel for shrinking.

EXAMPLE I

In this example, four layer films of the same thickness (2 mils) and differing solely in selection of the third (barrier) layer were compared in terms of clarity, i.e. haze and gloss. The films were prepared by simultaneous co-extrusion of the four layers using the conventional double-bubble technique, followed by irradiation at 3 MR. In each instance the first (meat contact) layer was formed of ethylene-propylene random copolymer 42×07 manufactured by Soltex Polymer Corporation with an ethylene content in the range of 1–5 wt. %, and a layer thickness of about 0.3 mils. This compound had a melting point at 143° C. and a melt flow index of 4.0 g/10 minutes. The second (inner core) layer comprised 80 wt. % EVA (12% vinyl acetate, 0.25 melt index) - 20 wt. % Admer NF-500 adhesive, and had a thickness of about 1.0 mils. The third (barrier) layer was a blend of 80 wt. % EVOH and 20 wt. polyamide as summarized in Table B, had a thickness of about 1.0 mils. The EVOH used in this layer was "EVAL G" available from EVAL Company of America, and the polyamides were "Grilon CR 9" in sample 1 and "Grilon CA 6" in sample 2, both available from Emser Industries. The fourth (abuse) layer was identical to the second (inner core) layer. Film samples 1 and 2 were about 2 mils thick.

The effect of the third (barrier) layer formulation on the optical properties of these irradiated films is summarized in Table B.

the EVOH melting point) has good optical properties, i.e. gloss of at least about 55% and haze below about 15%. This comparison demonstrates the importance of the relationship between the melting points of these two constituents in the barrier layer blend.

In particular, the data supports the requirement that to achieve the good clarity of the present four layer film, the amide polymer of the barrier layer must have a melting point which is within about 25° C. of the EVOH melting point, and preferably within about 15° C. of the barrier layer EVOH. The reason for this requirement appears to be non-homogenity of mixing or basic incompatibility of the polymer blend if the melting points are too widely separated.

EXAMPLE II

Another series of tests were conducted to demonstrate the unexpected effect on impact strength by adding a small proportion of very low density polyethylene to the ethylene-polypropylene random copolymer ("polypropylene") first (meat contact) layer of the present four layer film. These films were not irradiated, so would be most suitable for shrink-packaging fresh beef.

In these tests, the aforedescribed sample 2 without VLDPE used as the control, and sample 3 differed only in that the first (meat contact) layer also contained 10 wt. % Dowlex 4002 obtained from Dow Chemical Company having a 2.0 melt index and 0.912 density. According to the manufacture, this "ultra low density polyethylene" material is prepared by copolymerization of ethylene and octene. Sample 3 was also prepared by co-extrusion of the four layers using the double bubble technique, and the resulting film thickness was about the same as sample 2, i.e. about 2 mils. The optical properties (haze % and gloss %) were measured along with the dynamic puncture values. The dynamic puncture resistance was tested using a Dynamic Ball Burst Tester, Model No. 13-8 available from Testing Machines, Inc., Amityville, N.Y. The tester probe arm of the machine is provided with a metal point made to simulate a sharp bone end about ⅜ inch in diameter. In the test the probe arm is impacted against the sample of film and the energy required to puncture the film is recorded. The

TABLE B

| | Effect of Barrier Layer Selection | | |
|---|---|---|---|
| Sample No. | Barrier Layer Formulation | Haze % (ASTM D-1003) | Gloss % (ASTM D-2457) |
| 1 | 80% EVOH*/20% Nylon 6/12 (195° C. MP and 6/12 about 90/10) | 17.2 | 39 |
| 2 | 80% EVOH*/20% Nylon 6/12 (145° C. MP and 6/12 about 60/40) | 9.7 | 64 |

*Melting point (MP) is 156° C. and ethylene content is 48%.

Table B shows that the sample 1 (amide polymer results of these tests are summarized in Table C.

TABLE C

| | Effect of Polypropylene/VLDPE Blend | | | |
|---|---|---|---|---|
| Sample No. | Meat Contact Layer Formulation | Haze % (ASTM D-1003) | Gloss % (ASTM D-2457) | Dynamic Puncture Kg-cm/mil |
| 2 | Polypropylene random copolymer | 97 | 64 | 1.36 |
| 3 | 90% Polypropylene random copolymer/ 10% VLDPE | 8.4 | 64 | 1.68 | melting point is 39° C. above the EVOH melting point) has relatively poor optical properties. In contrast, the sample 2 (amide polymer melting point is 11° C. below Table C shows that the 10% VLDPE-containing first (meat contact) four layer film embodiment of this invention provides substantially higher (about 23% increase) puncture dynamic resistance than an otherwise identical film without the VLDPE. Also, the good optical properties of the control sample 2 were retained by the VLDPE-containing sample 3. Even though the prior art has recognized that VLDPE has potential as a polypropylene impact modifier, the impact strength of the same Dowlex 4002 VLDPE blown film is about the same as the control film sample 2, i.e. 1.3 Kg-cm/mil. Accordingly, it was surprising that the 10% VLDPE blend provided a substantial increase in film dynamic impact strength.

In a preferred embodiment of this invention, the first (meat contact) layer contains up to about 20 wt. % very low density polyethylene because higher amounts would effectively reduce the melting point of the inner layer, perhaps to a level below the high temperature cooking range. Most preferably the first layer contains between about 8 and 12 wt. % every low density polyethylene as a balance between high dynamic puncture resistance and high melting point.

EXAMPLE III

In these tests, the physical and optical properties of three different four layer film embodiments of this invention (including the previously described samples 2 and 3) were compared with an apparently six layer commercially available cook-in film of the general type described in the aforementioned U.S. Pat. No. 4,469,742. Sample 4 had a third (barrier) layer comprising 80% EVOH, ie. "EVAL H" available from EVAL Company of America (melting point 175° C.) and 20% poly amide, ie. Grilon CR 9 (melting point 195° C.). Accordingly, the melting point difference was 20° C. Since the other three layers of sample 4 were identical to sample 2, sample 4 is an embodiment of this invention. Sample 4 was prepared by co-extrusion of the four layers in same manner as samples 2 and 3, and irradiated to 3 MR.

The sample 5 prior art film was manufactured by W. R. Grace Company's Cryovac Division and sold with a product designation CN-530. It appeared to comprise six layers, i.e., ethylene-propylene random copolymer/EVA/adhesive/EVOH/adhesive/EVA. The irradiation level is unknown but the manufacturer's aforementioned U.S. Pat. No. 4,469,742 describing this type of film states that irradiation dosage of at least 6 MR is preferred. The results of these property comparison tests are summarized in Table D.

TABLE D

| | Irradiated Film Properties | | | |
| | Sample | | | |
| | Sample 2 | Sample 3 | Sample 4 | Sample 5 |
|---|---|---|---|---|
| Gauge, Mils | 1.75 | 1.85 | 2.0 | 2.5 |
| Tensile Strength, PSI, MD | 7,200 | 8,000 | 7100 | 6,800 |
| (ASTM D-892) TD | 6,100 | 6,000 | 5900 | 7,500 |
| % Elongation @ Brk, MD | 44 | 59 | 44 | 215 |
| TD | 62 | 49 | 32 | 100 |
| Secant Modulus, PSI, MD | 42 M | 56 M | 40 M | 39 M |
| TD | 53 M | 50 M | 56 M | 50 M |
| % Shrinkage @ 90° C., MD | 16 | 18 | 12 | 26 |
| TD | 20 | 20 | 20 | 36 |
| Haze, % (ASTM D-1003) | 14 | 13 | 11 | 10 |
| Gloss, % (ASTM D-2457) | 58 | 52 | 57 | 67 |
| O$_2$ Permeability cc/100 in. 2/24 hrs. | 2.10 | 2.05 | 0.33 | 0.3 |
| Dynamic Puncture, | | | | |

TABLE D-continued

| | Irradiated Film Properties | | | |
| | Sample | | | |
| | Sample 2 | Sample 3 | Sample 4 | Sample 5 |
|---|---|---|---|---|
| Kg-cm/Mil | 0.95 | 0.92 | 1.12 | 1.1 |

Table D shows that certain of the physical properties of four layer film of this invention are comparable to the six layer prior art film sample, ie., tensile strength, secant modulus and dynamic puncture. The other physical properties (elongation and shrinkage) are satisfactory for commercial use, as is the oxygen permeability. The optical properties are equivalent to the prior art film. Moreover, the present film is less expensive to the manufacture, requires less complex extrusion equipment, and probably requires lower irradiation dosage.

EXAMPLE IV

In this series of ham cook-in tests, the previously described sample 2 and 4 embodiments of this invention were compared with a prior art six layer film. (Sample 6) The latter was manufactured by W. R. Grace Company's Cryovac Division and sold with a product designation CN-510. It appeared to comprise Surlyn/EVA adhesive/EVOH/EVA adhesive/EVA. The irradiation level is unknown but the manufacturer's aforementioned U.S. Pat. No. 4,469,742 describing this of at least 6 MR is preferred. The films were formed into seamed tubes with one end sealed. The resulting articles were hand stuffed with chunked, sweet pickeled hams, placed in molds and hot water immersion cooked at 180° F. until the internal temperature reached 150° F. The results of these cook-in tests are summarized in Table E.

TABLE E

| | Cook-In Tests | | |
| Sample No. | Flat Width (in) | Cook Yield (%) | Film Thickness (mils) |
|---|---|---|---|
| 2 | 9 | 100 | 1.85 |
| 4 | 9 | 99.9 | 1.75 |
| 6 | 9 | 99.8 | 3.3 |

Table E shows that all samples had excellent cook yields. Accordingly, Example 4 demonstrates that the four layer film of this invention is functionally equivalent to a six layer commercially employed prior art film in ham cook-in performance. Moreover, samples 2 and 4 did not adhere to the ham, so would be suitable for packaging beef (including cook-in) in the high temperature cooking range.

While the preferred embodiments of the invention have been disclosed hereinabove, those skilled in the art will appreciate that changes and modifications may be made therein without departing from the spirit and scope of the invention.

What is claimed is:

1. A four layer shrink film comprising:
   (a) a first or meat contact layer comprising an ethylene-propylene random copolymer;
   (b) a second or inner core layer directly adhered to one side of said first layer comprising a blend of between about 20 and 60 wt. % anhydride-modified ethylene copolymer adhesive having a Vicat softening point of at least about 90° C. and between about 40 and 80 wt. % ethylene vinyl acetate containing between about 4 and 15 wt. % vinyl acetate, said blend having a melt index up to and including about 0.9;

(c) a third or barrier layer directly adhered to the opposite side of said second layer from said first layer and comprising a blend of between about 60 and 90 wt. % hydrolyzed ethylene vinyl acetate copolymer (EVOH) containing between about 32 and 52 wt. % ethylene, and between about 10 and 40 wt. % amide polymer having a melting point within about 25° C. of the EVOH melting point; and (d) a fourth or abuse layer directly adhered to the opposite side of said third layer from said second layer comprising a blend of between about 10 to 40 wt. % anhydride-modified ethylene copolymer adhesive having a Vicat softening point of at least about 90° C. and between about 60 and 90 wt. % ethylene vinyl acetate containing between about 4 and 15 wt. % vinyl acetate, said blend having a melt index up to and including about 0.9.

2. A film according to claim 1 wherein said first layer comprises an ethylene-propylene random copolymer containing between about 1 and 5 wt. % ethylene.

3. A film according to claim 1 wherein said adhesive of said second layer is anhydride-modified linear low density polyethylene.

4. A film according to claim 1 wherein said adhesive of said second layer is maleic anhydride-modified linear low density polyethylene.

5. A film according to claim 1 wherein said adhesive of said second layer is anhydride-modified low density polyethylene.

6. A film according to claim 1 wherein said adhesive of said second layer is anhydride-modified medium density polyethylene.

7. A film according to claim 1 wherein said adhesive of said second layer is anhydride-modified high density polyethylene.

8. A film according to claim 1 wherein said adhesive of said second layer is anhydride-modified ethylene vinyl acetate.

9. A film according to claim 1 wherein said second layer comprises a blend of between about 30 and 45 wt. % anhydride-modified ethylene copolymer adhesive, and between about 55 and 70 wt. % ethylene vinyl acetate.

10. A film according to claim 1 wherein said ethylene vinyl acetate of said second layer contains between about 7 and 12 wt. % vinyl acetate.

11. A film according to claim 1 wherein said adhesive of said fourth layer is anhydride-modified linear low density polyethylene.

12. A film according to claim 1 wherein said adhesive of said fourth layer is maleic anhydride-modified linear low density polyethylene.

13. A film according to claim 1 wherein said adhesive of said fourth layer is anhydride-modified low density polyethylene.

14. A film according to claim 1 wherein said adhesive of said fourth layer is anhydride-modified medium density polyethylene.

15. A film according to claim 1 wherein said adhesive of said fourth layer is anhydride-modified high density polyethylene.

16. A film according to claim 1 wherein said adhesive of said fourth layer is anhydride - modified ethylene vinyl acetate.

17. A film according to claim 1 wherein said fourth layer comprises a blend of between about 10 and 20 wt. % anhydride-modified ethylene copolymer adhesive, and between about 80 and 90 wt. % ethylene vinyl acetate.

18. A film according to claim 1 wherein said ethylene vinyl acetate of said fourth layer contains between about 7 and 12 wt. % vinyl acetate.

19. A film according to claim 1 wherein the melting point of the third layer amide polymer is within 15° C. of the EVOH melting point.

20. A film according to claim 1 wherein said third layer comprises a blend of between about 70 and 85 wt. % hydrolyzed ethylene vinyl acetate copolymer and between about 15 and 30 wt. % amide polymer 21. A film according to claim 1 wherein said amide polymer in the core layer is a Nylon 6 copolymer 22. A film according to claim 20 wherein said Nylon 6 copolymer is Nylon 6/12.

23. A film according to claim 20 wherein said Nylon 6 copolymer is Nylon 6/66.

24. A film according to claim 1 wherein said hydrolyzed ethylene vinyl acetate copolymer of said third layer contains between about 38 and 48 wt. % ethylene.

25. A film according to claim 1 having gloss of at least about 55% and haze below about 15%.

26. A film according to claim 1 wherein the entire film is irradiated.

27. A film according to claim 26 which is irradiated to between about 2 and 4 MR.

28. A film according to claim 1 wherein said first layer contains up to about 20 wt. % very low density polyethylene.

29. A film according to claim 28 wherein said first layer contains between about 8 and 12 wt. % very low density polyethylene.

30. A four layer cook-in shrink film comprising:

(a) a first or meat contact layer comprising an ethylene propylene random copolymer containing between about 1 and 5 wt. % ethylene;

(b) a second or inner core layer directly adhered to one side of said first layer comprising a blend of between about 30 and 50 wt. % maleic anhydride-modified linear low density polyethylene adhesive having a Vicat softening point of about 100° F. and a melting point of about 120° F., and between about 50 and 70 wt. % ethylene vinyl acetate containing between about 10 and 12 wt. % vinyl acetate, said blend having a melt index up to and including about 0.9;

(c) a third or barrier layer directly adhered to the opposite side of said second layer from said first layer and comprising a blend of between about 70 and 85 wt. % hydrolyzed ethylene vinyl acetate copolymer (EVOH) and between about 15 and 30 wt. % amide polymer; and (d) a fourth or abuse layer directly adhered to the opposite side of said third layer form said second layer comprising a blend of between about 10 and 20 wt. % maleic anhydride-modified linear low density polyethylene and between about 80 and 90 wt. % ethylene vinyl acetate having between about 10 and 12 wt. % vinyl acetate, said blend having a melt index up to and including about 0.9; and (e) the entire film being irradiated to between about 2 and 4 MR, and having gloss of at least about 55% and haze of less than about 15%.

* * * * *

UNITED STATES PATENT AND TRADEMARK OFFICE
CERTIFICATE OF CORRECTION

PATENT NO.   : 4,857,399

DATED        : August 15, 1989

INVENTOR(S)  : Stephen J. Vicik

It is certified that error appears in the above-identified patent and that said Letters Patent is hereby corrected as shown below:

In col. 1, line 23, change "115°-185°" to --155°-185°--.

In col. 2, line 2, change "diversion" to --diversions--.

In col. 3, line 9, change "ensuring" to --ensuing--.

In col. 3, line 20, change "60 wt. %" to --80 wt. %--.

In col. 3, line 25, change "form" to --from--.

In col. 4, line 29, change "if" to --is--.

In col. 6, line 49, change "is" to --its--.

In col. 7, line 57, change "of" to --for--.

In col. 9, line 10, change "150°C to 190°F" to --150 to 190°F--.

In col. 11, line 19, change "every" to --very--.

In col. 12, line 16, in the second instance, delete "the".

In col. 14, line 21, change "6/66" to --6,66--.

In col. 14, line 45, change "100°F" to --100°C--.

In col. 14, line 46, change "120°F" to --120°C--.

In col. 14, line 58, change "form" to --from--.

Signed and Sealed this

Third Day of September, 1991

Attest:

HARRY F. MANBECK, JR.

*Attesting Officer*     *Commissioner of Patents and Trademarks*